US011300113B2

(12) United States Patent
Mohamed

(10) Patent No.: US 11,300,113 B2
(45) Date of Patent: Apr. 12, 2022

(54) SYSTEM FOR RETAINING A VALVE ASSEMBLY IN A CAVITY FORMED IN A CYLINDER BODY OF A COMPRESSOR AND METHOD OF USE THEREOF

(71) Applicant: Zahroof Valves Inc., Houston, TX (US)

(72) Inventor: Zahroof Mohamed, Houston, TX (US)

(73) Assignee: Zahroof Valves Inc.

( * ) Notice: Subject to any disclaimer, the term of this patent is extended or adjusted under 35 U.S.C. 154(b) by 0 days.

(21) Appl. No.: 16/870,678

(22) Filed: May 8, 2020

(65) Prior Publication Data

US 2021/0348600 A1 Nov. 11, 2021

(51) Int. Cl.
*F16K 43/00* (2006.01)
*F04B 39/10* (2006.01)
*F16K 27/02* (2006.01)
*F16K 27/00* (2006.01)

(52) U.S. Cl.
CPC ............. *F04B 39/10* (2013.01); *F16K 27/00* (2013.01); *F16K 27/0209* (2013.01)

(58) Field of Classification Search
CPC .... F04B 39/10; F04B 39/1066; F04B 39/108; F04B 39/127; F04B 53/16; F04B 53/166; F04B 53/168; F16K 27/02; F16K 27/12
See application file for complete search history.

(56) References Cited

U.S. PATENT DOCUMENTS

| | | | | |
|---|---|---|---|---|
| 2,160,401 A | * | 5/1939 | Engelman | F04B 39/1073 417/559 |
| 2,717,186 A | * | 9/1955 | Campbell | F04B 53/168 92/163 |
| 2,732,809 A | * | 1/1956 | Mattingly et al. | F04B 53/168 92/171.1 |
| 2,981,575 A | * | 4/1961 | Leman | F16J 13/02 92/171.1 |
| 7,290,560 B2 | * | 11/2007 | Orr | F04B 53/007 137/454.2 |
| 2017/0058889 A1 | * | 3/2017 | Hoban | F04B 39/064 |
| 2019/0145403 A1 | * | 5/2019 | Blume | F04B 1/0456 417/437 |

* cited by examiner

*Primary Examiner* — Reinaldo Sanchez-Medina
(74) *Attorney, Agent, or Firm* — Jonathan Pierce; Pierre Campanac; Porter Hedges LLP

(57) ABSTRACT

A system for retaining a valve assembly in a cavity formed in a cylinder body of a compressor includes a ring having a through-hole positioned adjacent to the cavity and a cover partially inserted inside a through-hole of the ring. The cover and the ring can slide relative to each other. The position of the cover relative to the cylinder body can be adjusted by tightening a cover retainer. The cover applies a downward force on the valve assembly via a cage. The downward force is used to compress a seal located between the valve assembly and the cylinder body. A seal is positioned between the ring and the cover. The seal remains squeezed when the cover and the ring slide relative to each other. The system can be used to convert a jackbolt cage-cover assembly and may not require significant machining of the cavity to provide a surface-finish with a suitable roughness for a sealing surface.

23 Claims, 8 Drawing Sheets

SYSTEM FOR RETAINING A VALVE ASSEMBLY IN A CAVITY FORMED IN A CYLINDER BODY OF A COMPRESSOR AND METHOD OF USE THEREOF

CROSS-REFERENCE TO RELATED APPLICATIONS

None

BACKGROUND

This disclosure relates generally to systems for retaining a valve assembly in a cavity that is formed in a body of a compressor cylinder, and to methods of use of such systems. This disclosure relates more particularly to systems for retaining a valve assembly that can be retrofitted on the body of the compressor cylinder without requiring significant machining of the cavity.

FIG. 1 is a schematic view of a known jackbolt cage-cover assembly for retaining a valve assembly 24 of a compressor cylinder. The valve assembly 24 may be of a reed type or other known type of check valve. The valve assembly 24 is positioned in a cavity that is formed in a cylinder body 10 of the compressor. The cavity has an opening that provides access to the valve assembly 24, for example, for inspection and maintenance of the valve assembly 24. When the compressor is in use, the opening is closed with a cover 16 that is held in place with bolts screwed to the cylinder body 10 or studs 28 that are secured to the cylinder body 10 and cover nuts 30. A cover gasket seal 20 placed on a shoulder 32 is used to prevent gas leakage between the cover 16 and the cylinder body 10. The cover gasket seal 20 is compressed or made to effectively seal by tightening the cover nuts 30.

The valve assembly 24 is seated on a valve gasket seal 26 that prevents leakage of gas compressed in a cylinder bore formed in the cylinder body 10 below the valve assembly 24 into an inlet passageway also formed in the cylinder body 10. A seal nut 12, jackbolt 14, and cage 22 are provided to compress or to effectively seal the valve gasket seal 26. The seal nut 12 is attached to the cover 16. The jackbolt 14 can be lowered or raised by rotation inside the seal nut 12. A downward force is generated by tightening the jackbolt 14. The cage 22 transmits a downward force on the valve assembly 24. This downward force is applied to the valve gasket seal 26. A seal 18 may be provided around the jackbolt 14 to prevent gas leakage. The cage 22 permits gas flow therethrough into the valve assembly 24.

In the example shown, the valve assembly 24 is a suction valve that allows gas flow only from the inlet passageway into the cylinder bore. The direction of gas flow is indicated by a dashed arrow. However, in other places in the compressor cylinder, a discharge valve assembly similar to the valve assembly 24 may alternatively allow gas flow only from the cylinder bore toward an outlet passageway that is formed in the cylinder body 10 similarly to the inlet passageway. The discharge valve assembly would also be retained using a jackbolt cage-cover assembly.

One disadvantage of the jackbolt cage-cover assembly shown in FIG. 1 is that tightening the jackbolt 14 applies an upward force to the cage nut 12. This upward force tends to unload the compression force on the cover gasket seal 20, which may then leak gas.

If a leak through the cover gasket 20 is detected, tightening the cover nuts 30 to compress the cover gasket 20 will also force the jackbolt 14 down, exerting more force on the cage 22, the valve assembly 24 and the valve gasket seal 26. It is possible that this added force can exceed the compression limit of the valve gasket seal 26, causing it to fail and leak. Also, it is possible that the added force can break the cage 22 and the valve assembly 24 too.

With the jackbolt cage-cover assembly shown in FIG. 1, it is difficult to compress both the cover gasket seal 20 as well as the valve gasket seal 26 to the optimum value, requiring skill and experience.

FIG. 2 is a schematic view of another known assembly for retaining the valve assembly 24. Unlike the jackbolt cage-cover assembly shown in FIG. 1, where a cover gasket seal 20 is used to prevent gas leakage between the cover 16 and the cylinder body 10, the cover 16 has a groove in which an O-ring 38 is provided. The groove in the cover 16 includes a sealing surface having a surface-finish roughness that is suitable for providing a static gas seal against the O-ring 38. In addition, a sealing surface 34 is machined on the cylinder body 10 such that it has a surface-finish roughness that is suitable for providing a static gas seal against the O-ring 38. Furthermore, unlike the jackbolt cage-cover assembly shown in FIG. 1, where an additional seal nut 12 and jackbolt 14 need to be provided to compress or effectively seal the valve gasket seal 26, the cover 16 is directly coupled to the cage 22, which may be held by the clinch-pin 36. The design of the cover 16 shown in FIG. 2 eliminates the leak path through the cover 16 that needs to be sealed with a seal 18 in the jackbolt cage-cover assembly shown in FIG. 1.

Accordingly, tightening the cover nuts 30 causes the cover 16 to slide downward relative to the cylinder body 10, apply a downward force to the cage 22 and the valve assembly 24, and compress the valve gasket seal 26. As such, an operator can compress or effectively seal the valve gasket seal 26 by tightening the cover nuts 30 to cause the cover 16 to slide relative to the cylinder body 10. However, in contrast with the cover gasket seal 20 of the jackbolt cage-cover assembly shown in FIG. 1, where the position of the cover 16 determines the compression of the cover gasket seal 20, the compression of the O-ring 38 (squeezed between two cylindrical sealing surfaces) does not change when the cover 16 slides relative to the cylinder body 10. That is, the O-ring compression is not affected when the cover nuts 30 are tightened to compress the valve gasket seal 26 under the valve assembly 24. Note that gaskets are designed to work effectively under a compressive load that is defined by the material, size, and thickness of the gasket, while O-rings are designed to work effectively squeezed between the two cylindrical sealing surfaces. The amount of squeezing is typically based on the diameter of the O-ring cross-section, the O-ring material, the groove geometry, and the radial clearance between the two cylindrical sealing surfaces. There are O-ring design guides that specify the amount of squeezing required, e.g., the Parker O-ring handbook.

While the assembly for retaining the valve assembly 24 shown in FIG. 2 may provide some benefits over the jackbolt cage-cover assembly shown in FIG. 1, it requires that a sealing surface 34 having a surface-finish roughness that is suitable for providing a static gas seal against the O-ring 38 be provided on the cylinder body 10. Therefore, the assembly for retaining the valve assembly 24 shown in FIG. 2 may not be retrofittable on the cylinder of an existing compressor without significant machining of the cavity, which is usually not feasible on a compressor that is operating.

Thus, there is a continuing need in the art for systems for retaining a valve assembly. These systems can be used for retrofitting cylinders that use a known jackbolt cage-cover assembly to retain the valve assembly without requiring significant machining of the cavities formed in the cylinders. For example, these systems may include an O-ring cover and cage to retain the valve assembly.

BRIEF SUMMARY OF THE DISCLOSURE

The disclosure describes a system that may be used for retaining a valve assembly in a cavity formed in a cylinder body of a compressor.

The system may comprise a ring having a through-hole that is positioned adjacent to the cavity formed in the cylinder body of the compressor. The ring may include a first sealing surface having a surface-finish roughness suitable for providing a static gas seal against a second seal. In some embodiments, the first sealing surface may be located on the through-hole of the ring. The ring may include a flange. In some embodiments, the flange may have a plurality of holes, and the cylinder body of the compressor may have a corresponding plurality of threaded holes aligned with the plurality of holes provided in the flange.

The system may comprise a cover that is sized to be at least partially inserted inside the through-hole of the ring. The cover may further be sized such that the cover and the ring can slide relative to each other within a range of relative positions. The cover may include a second sealing surface having a surface-finish roughness suitable for providing a static gas seal against the second seal. In some embodiments, the cover may include a groove. The second sealing surface may be located inside the groove. In some embodiments, the cover may have a plurality of threaded through-holes intersecting an abutment surface of the ring.

The system may comprise a first seal that is sized to be positioned between the ring and the cylinder body of the compressor. In some embodiments, the first seal may be a gasket seal that is disposed on a shoulder located in the cavity formed in the cylinder body of the compressor.

The system may comprise the second seal, which is sized to be positioned between the ring and the cover. Preferably, the second seal may be configured such that the second seal remains squeezed between the ring and the cover when the cover and the ring slide relative to each other within the range of relative positions. In some embodiments, the second seal may be an O-ring.

The system may comprise a ring retainer that is capable of holding the ring in position. In some embodiments, the ring retainer may comprise an adhesive disposed between the ring and the cylinder body. The ring may be fixed to the cylinder body by the adhesive. The first seal and the ring retainer may optionally be integrated into the adhesive. In some embodiments, the ring retainer may include a plurality of ring nuts. Each of the ring nuts may be sized to engage one of a plurality of studs. In some embodiments, the ring retainer may include a plurality of bolts that are sized to pass through the holes provided in the flange of the ring. Each of the plurality of bolts may engage the threaded holes provided in the cylinder body of the compressor. In some embodiments, the ring retainer may include a plurality of jackbolts sized to pass through the threaded through-holes provided in the cover. Each of the plurality of jackbolts may engage the abutment surface of the ring.

The system may comprise a cover retainer that is secured to the cylinder body of the compressor. Preferably, the cover retainer is capable of holding the cover at least partially inserted in the through-hole of the ring and at an adjustable position relative to the cylinder body of the compressor. In some embodiments, the cover retainer may include at least some of the plurality of studs included in the ring retainer.

The disclosure describes a method for converting a system for retaining a valve assembly of a compressor.

The method may comprise the step of removing the system for retaining the valve assembly from a cavity formed in a cylinder body of the compressor.

The method may comprise the step of providing a valve cage sized to engage the valve assembly and a cover, such as described herein above.

The method may comprise the step of providing a first seal, such as described hereinabove, on the cylinder body of the compressor.

The method may comprise the step of positioning a ring having a through-hole, such as described hereinabove, against the first seal so that the first seal is located between the ring and the cylinder body of the compressor, and so that the through-hole of the ring is adjacent to the cavity formed in the cylinder body of the compressor.

The method may comprise the step of holding the ring in position using a ring retainer, such as described hereinabove.

The method may comprise the step of providing a second seal, such as described hereinabove, on the ring or on the cover. The second seal may be an inner or outer diameter seal.

The method may comprise the step of inserting the cover at least partially inside the through-hole of the ring so that the second seal is located between the ring and the cover.

The method may comprise the step of sliding the cover and the ring relative to each other within a range of relative positions while maintaining the second seal loaded for adjusting a position of the cover relative to the cylinder body of the compressor. For example, the method may comprise the step of causing the cover and the ring to slide relative to each other using one of the ring retainer or a cover retainer, such as described hereinabove.

The method may comprise the step of compressing a third seal disposed between the valve assembly and the cylinder body of the compressor by sliding the cover relative to the cylinder body of the compressor.

The method may comprise the step of holding the cover at least partially inserted in the through-hole of the ring at the adjusted position using the cover retainer.

BRIEF DESCRIPTION OF THE DRAWINGS

For a more detailed description of the embodiments of the disclosure, reference will now be made to the accompanying drawings, wherein.

DETAILED DESCRIPTION

Figure 1:
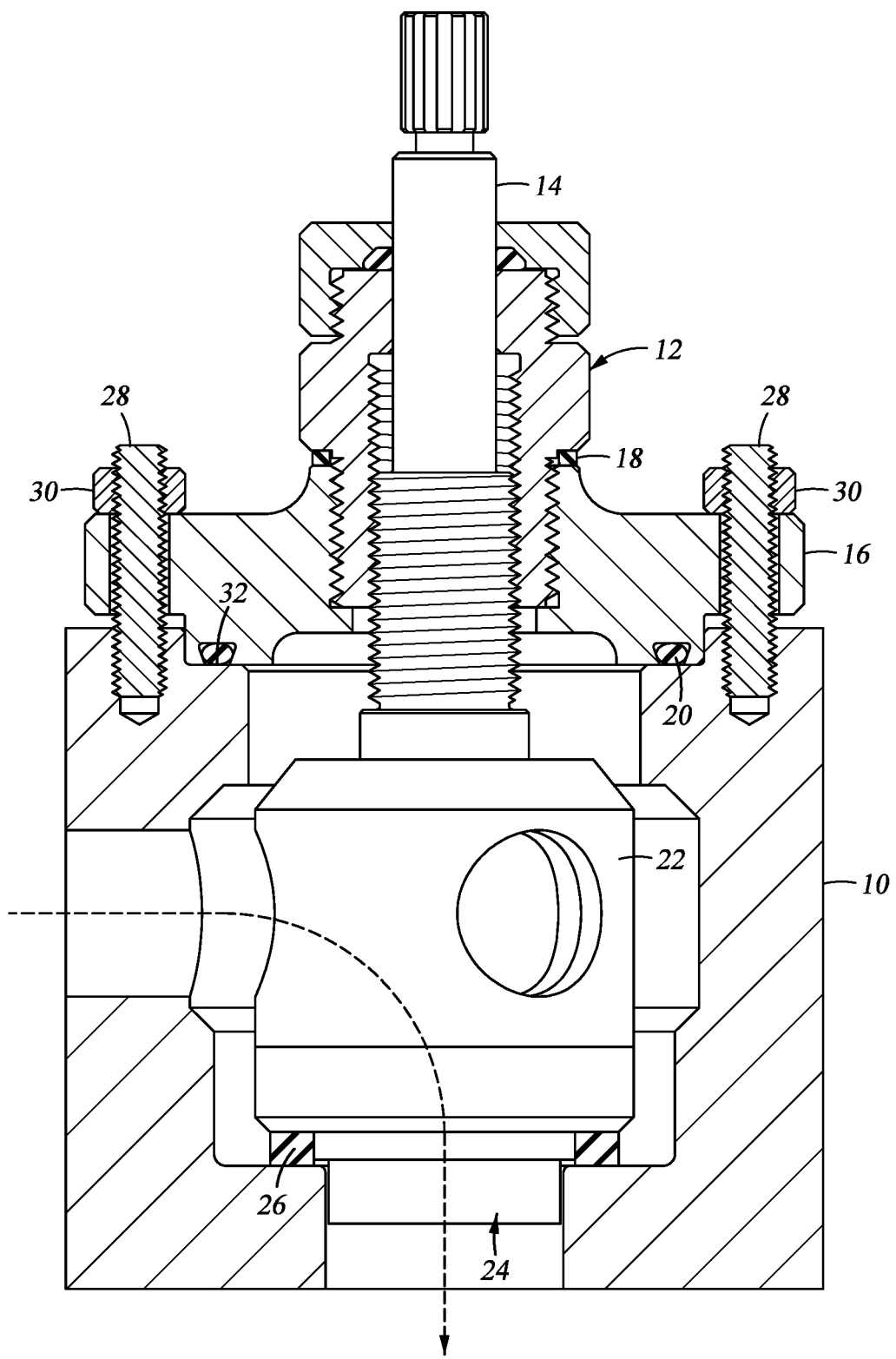
FIG. 1 is a schematic view of a known jackbolt cage-cover assembly for retaining a valve assembly of a compressor.
Figure 2:
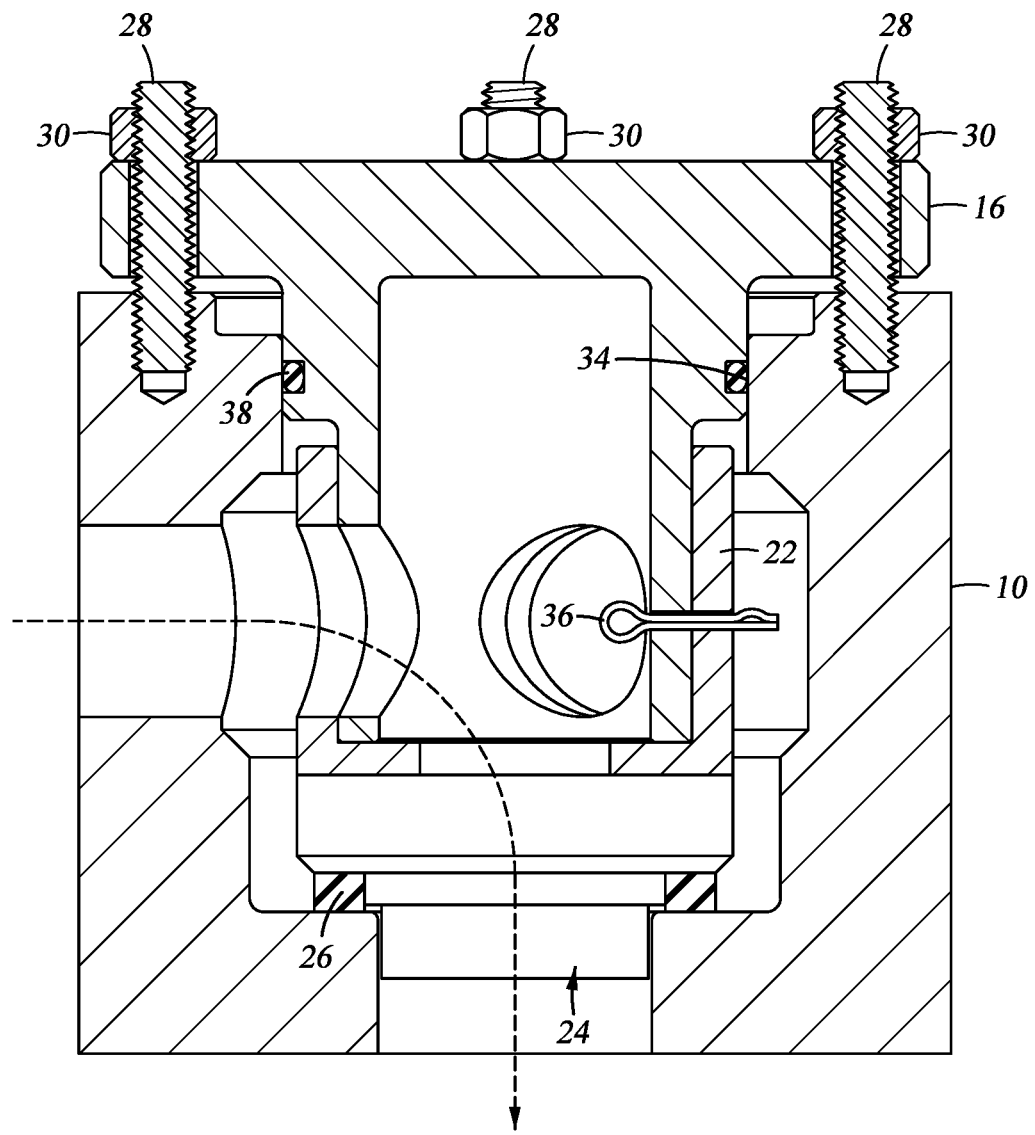
FIG. 2 is a schematic view of another known assembly for retaining a valve assembly of a compressor.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention.

Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures.

All numerical values in this disclosure may be approximate values unless otherwise specifically stated. Accordingly, various embodiments of the disclosure may deviate from the numbers, values, and ranges disclosed herein without departing from the intended scope.

Finally, the exemplary embodiments presented below may be combined in any combination of ways, i.e., any element from one exemplary embodiment may be used in any other exemplary embodiment without departing from the scope of the disclosure.

Systems for retrofitting a cylinder of a compressor using a jackbolt to retain a valve assembly with an O-ring cover and cage are disclosed herein. The systems include a ring having a through-hole positioned adjacent to a cavity formed in the cylinder body of the compressor and a cover partially inserted inside the through-hole of the ring. The cover and the ring can slide relative to each other. The position of the cover relative to the cylinder body can be adjusted by tightening a cover retainer. The cover applies a downward force on the valve assembly via a cage. The downward force is used to compress a seal located between the valve assembly and the cylinder body. A seal, preferably one or more O-rings, is positioned between the ring and the cover. The seal remains squeezed when the cover and the ring slide relative to each other. The systems can be used to convert a jackbolt cage-cover assembly and may not require significant machining of the cavity to provide a surface-finish with a roughness suitable for a sealing surface.

In some embodiments, the cover includes one or more grooves, each of which is suitably sized to retain one or more O-ring(s). The O-ring is suitably sized so that the outer diameter of the O-ring seals against a smooth surface on the ring. The smooth surface has a surface-finish suitable for sealing. In other embodiments, the groove may be formed in the ring to retain one or more O-ring(s), and the cover includes the smooth surface against which the inner diameter of the O-ring seals.

Figure 3:
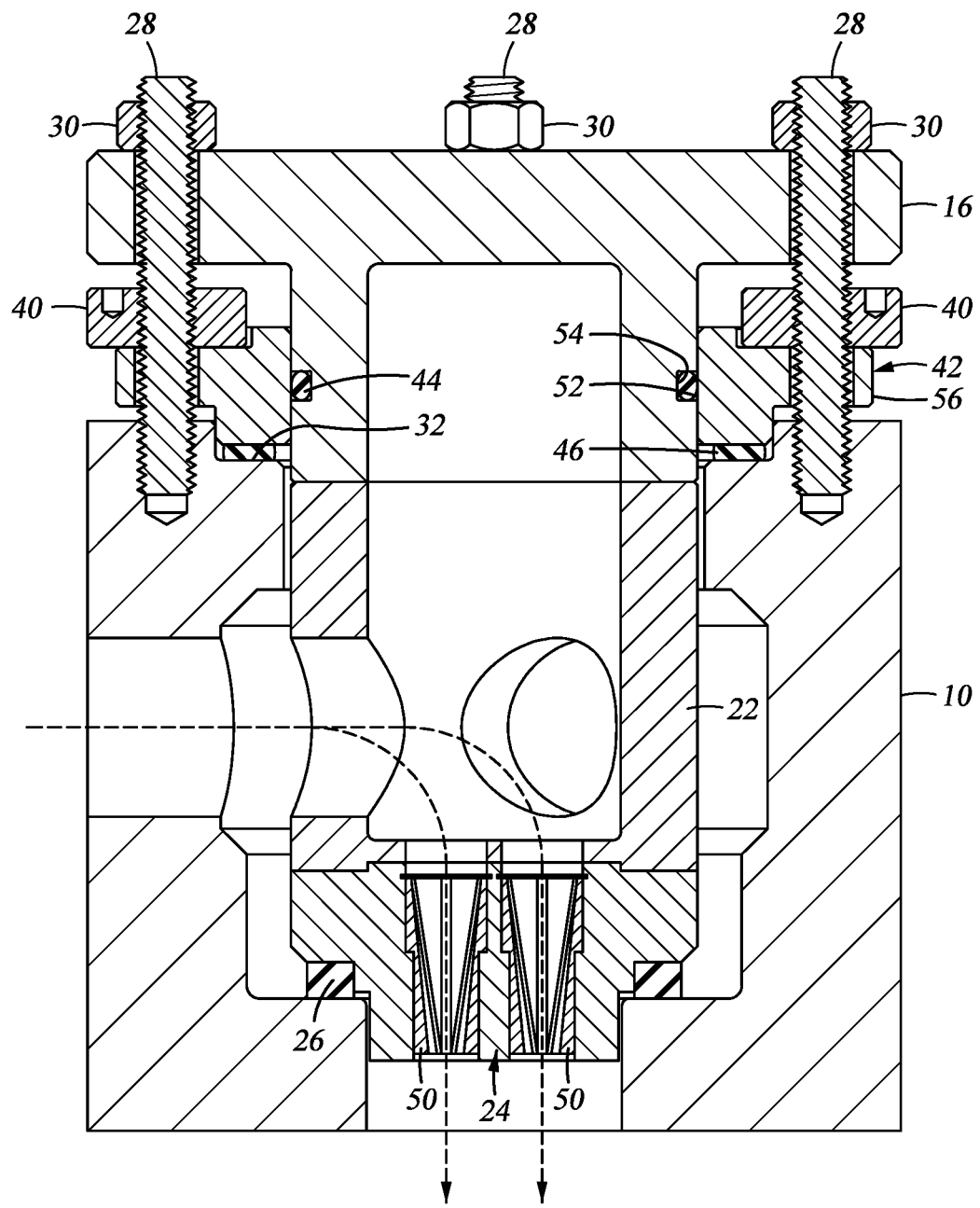
FIG. 3 is a sectional view of a system for retaining a valve assembly in a cavity formed in a cylinder body of a compressor in accordance with this disclosure, wherein a ring is retained using studs and ring nuts, or bolts.
Figure 4:
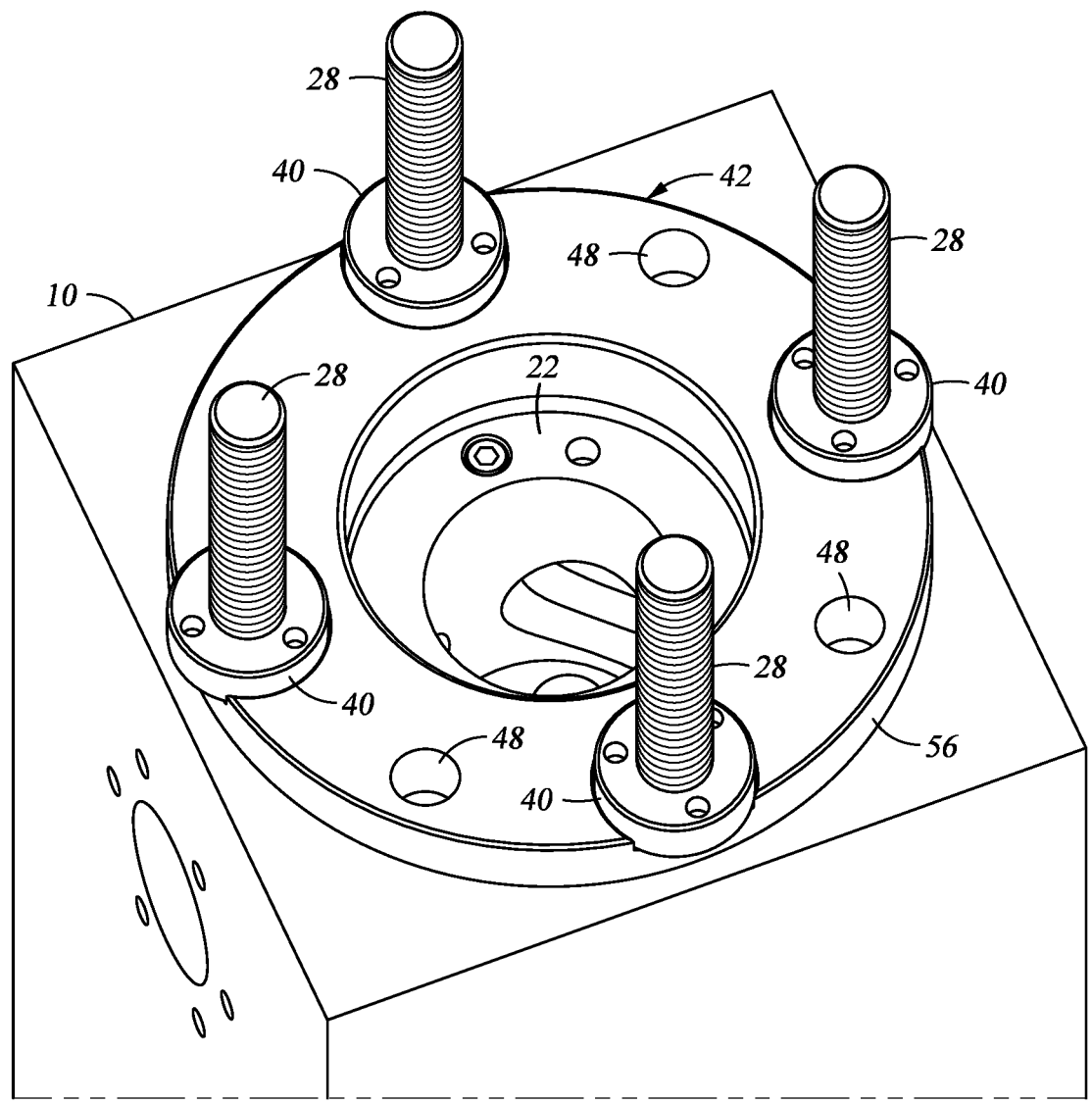
FIG. 4 is a perspective view of a portion of the system shown in FIG. 3.

Referring to FIGS. 3 and 4, a system for retaining the valve assembly 24 in the cavity formed in the cylinder body 10 of a compressor, is illustrated.

The system comprises a first seal 46 that is sized to be positioned on a shoulder 32 located in the cavity formed in the cylinder body 10 of the compressor. For example, the first seal 46 may be a gasket seal.

The system comprises a ring 42. The ring 42 has a through-hole positioned adjacent to the cavity formed in the cylinder body 10 of the compressor. The through-hole preferably has a circular cross-section; however, it may have other shapes, such as an elliptical cross-section. In the example of FIGS. 3 and 4, the ring 42 is sized to be at least partially inserted in the cavity formed in the cylinder body 10 of the compressor. However, in other examples, the ring 42 may not be at least partially inserted in the cavity formed in the cylinder body 10 of the compressor. Furthermore, the ring 42 is positioned above the first seal 46. Optionally, the ring 42 includes a flange 56. Preferably, the ring 42 is sized such that the flange 56 does not abut against a top surface of the cylinder body 10 as the ring 42 is positioned above the first seal 46.

The system comprises a ring retainer capable of holding the ring 42 at least partially inserted in the cavity formed in the cylinder body 10 of the compressor. In the embodiment illustrated in FIGS. 3 and 4, the ring retainer includes a plurality of ring nuts 40, each sized to engage one of a corresponding plurality of cover studs 28 that are secured to the cylinder body 10 of the compressor. Thus, each of the plurality of cover studs 28 can be used with one of the plurality of the ring nuts 40. Alternatively, only a subset of the plurality of cover studs 28 may be used with the plurality of ring nuts 40. The flange 56 includes a plurality of holes (or partial holes) through which the plurality of valve cover studs 28 pass and the ring nuts 40 can be tightened on the cover studs 28 against the flange 56 to hold the ring 42 in place.

Preferably, the ring 42 is sized and shaped such that it still does not abut against a top surface of the cylinder body 10 as the ring nuts 40 are tightened. The ring retainer is capable of holding the ring 42 at an adjustable position relative to the cylinder body 10 of the compressor. Accordingly, the first seal 46 can be compressed or effectively seal by tightening the ring nuts 40.

In other embodiments, a plurality of clearance holes 48 (such as shown in FIG. 4) may be provided in the flange 56 of the ring 42, and a corresponding plurality of threaded holes (not shown) that are aligned with the plurality of clearance holes 48 may be provided in the cylinder body 10 of the compressor. In such embodiments, the ring retainer may include a plurality of bolts (not shown) sized to pass through the clearance holes 48 in the flange and engage the threaded holes in the cylinder body 10 of the compressor. The first seal 46 would similarly be compressed or effectively seal by tightening the bolts. Thus, the bolts may be used to fasten the ring 42 to the cylinder body 10 without requiring the cover studs 28 and to fix the ring 42 almost permanently to the cylinder body 10. Preferably, the ring 42 is sized such that it does not abut against a top surface of the cylinder body 10 as the ring nuts 42 are tightened.

The system comprises a cover 16 (not shown in FIG. 4) that is sized to be at least partially inserted inside the through-hole of the ring 42. Additionally, the cover 16 is sized such that the cover 16 and the ring 42 can slide relative to each other within a range of relative positions.

The system comprises a second seal 44 (not shown in FIG. 4) that is sized to be positioned between the ring 42 and the cover 16. In the embodiment illustrated in FIGS. 3 and 4, the second seal 44 is an O-ring located inside a groove formed in the cover 16. The outer diameter of the O-ring seals against the ring. The ring 42 includes a first sealing surface 52. The first sealing surface 52 is a cylindrical surface located on all or a portion of a through-hole of the ring 42. The first sealing surface 52 has a surface-finish roughness suitable for providing a static gas seal against the second seal 44. For example, the roughness may not exceed 16 microinches RMS. The cover 16 includes a second sealing surface 54. The second sealing surface 54 is located inside the groove formed in the cover 16 in which the second seal 44 is disposed. The second sealing surface 54 has a surface-finish roughness suitable for providing a static gas seal against the second seal. Again, the roughness may not exceed 16 microinches RMS.

In other embodiments, the second seal 44 may alternatively be an O-ring located in a groove formed in the ring 42. The groove is suitably sized one or more O-rings, and the valve cover may have the smooth surface against which the inner diameter of the O-ring seals.

In other embodiments, the second seal 44 may include a type of seal other than O-rings, and/or a combination of types of seals. For example, the second seal 44 may include a lip seal.

The system comprises a cover retainer capable of holding the cover 16 at least partially inserted in the through-hole of the ring 42. In the embodiment illustrated in FIGS. 3 and 4, the cover retainer includes a plurality of cover nuts 30, each sized to engage one of the corresponding plurality of cover studs 28 that are secured to the cylinder body 10 of the compressor. Thus, each of the plurality of cover studs 28 can be used with both one of the plurality of cover nuts 30 and one of the plurality of the ring nuts 40. Alternatively, only a subset of the plurality of cover studs 28 may be used with the plurality of cover nuts 30.

The cover retainer is capable of holding the cover 16 at an adjustable position relative to the cylinder body 10 of the compressor. Thus, the cover 16 can be used to apply a downward force on the cage 22 and the valve assembly 24 and compress the valve gasket seal 26, which is disposed between the valve assembly 24 and the cylinder body 10 of the compressor. Accordingly, the valve gasket seal 26 can be compressed or effectively seal by tightening the cover nuts 30.

By allowing the cover 16 and the ring 42 to slide relative to each other when the ring nuts 40 and/or the cover nuts 30 are tightened, the first seal 46 and the valve gasket seal 26 can be independently compressed or effectively seal. However, the second seal 44 is configured such that it remains squeezed when the cover 16 and the ring 42 slide relative to each other within the range of relative positions.

Optionally, the valve assembly 24 can include a plurality of self-contained modular units 50, such as described in U.S. Pat. No. 9,989,161.

Figure 5:
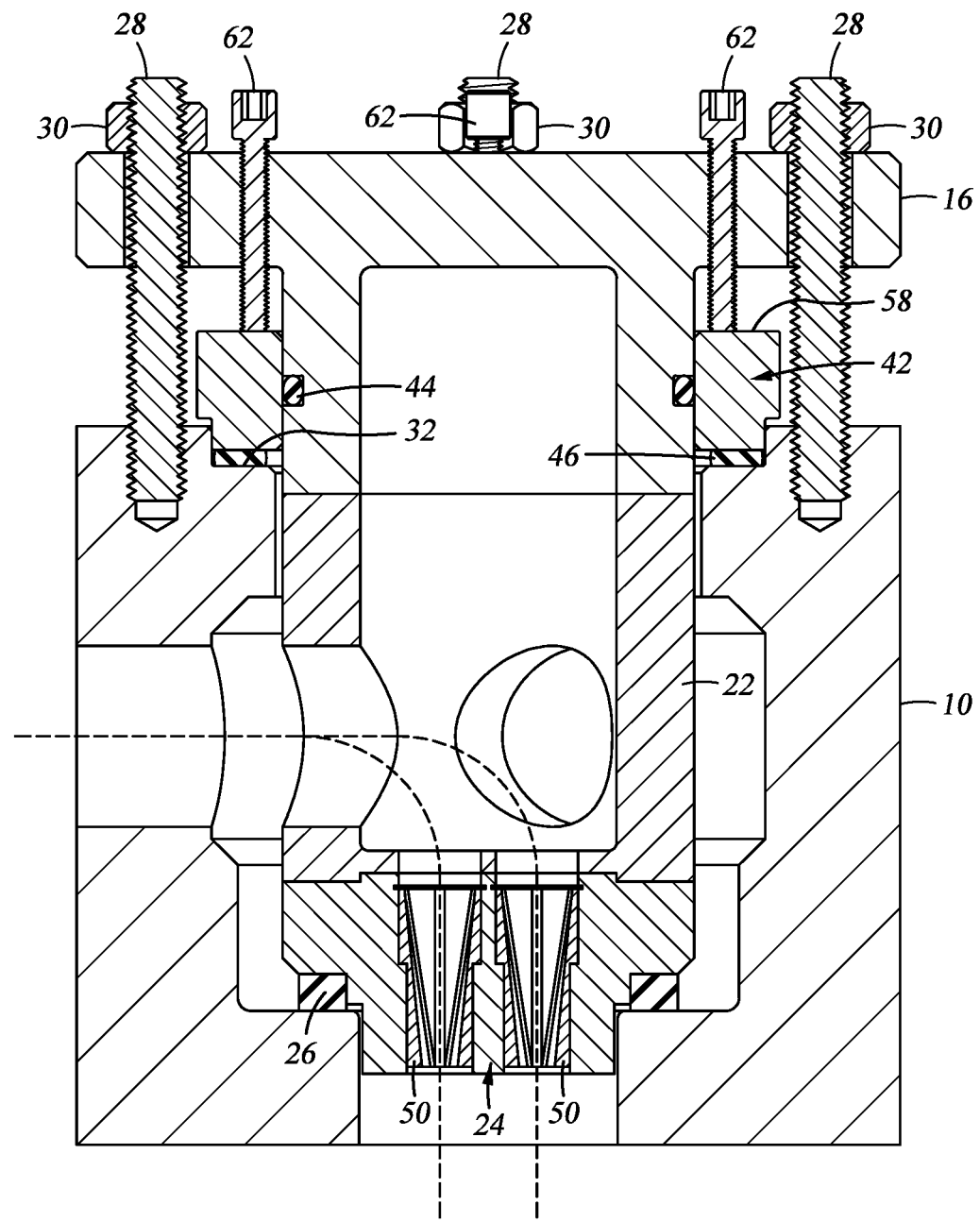
FIG. 5 is a sectional view of an alternative system for retaining a valve assembly in a cavity formed in a cylinder body of a compressor in accordance with this disclosure, wherein a ring is retained using jackbolts.

Referring to FIG. 5, an alternative system for retaining the valve assembly 24 in the cavity formed in the cylinder body 10 of the compressor, is illustrated.

In this embodiment, the cover 16 has a plurality of threaded through-holes intersecting an abutment surface 58 of the ring 4. The ring retainer includes a plurality of jackbolts 62 sized to pass through the threaded through-holes and engage the abutment surface 58 of the ring 42.

The valve gasket seal 26 can still be compressed or effectively seal by tightening the cover nuts 30. Then, the first seal 46 can be compressed or effectively seal by tightening the plurality of jackbolts 62. However, the plurality of jackbolts 62 is preferably not tightened excessively such that a force applied by the jackbolts 62 on the cap 16 causes the valve gasket seal 26 to be unloaded. Indeed, this unloading of the valve gasket seal 26 may be to a lesser extent than in the jackbolt cage-cover assembly shown in FIG. 1 because the jackbolts 62 are used to hold the ring 42 in place with some compression on the first seal 46, which may not require as much force as for the jackbolt 14 shown in FIG. 1 restraining the valve assembly 24 as shown in FIG. 1. Accordingly, the jackbolts 62 may be smaller than the jackbolt 14 shown in FIG. 1.

Figure 6:
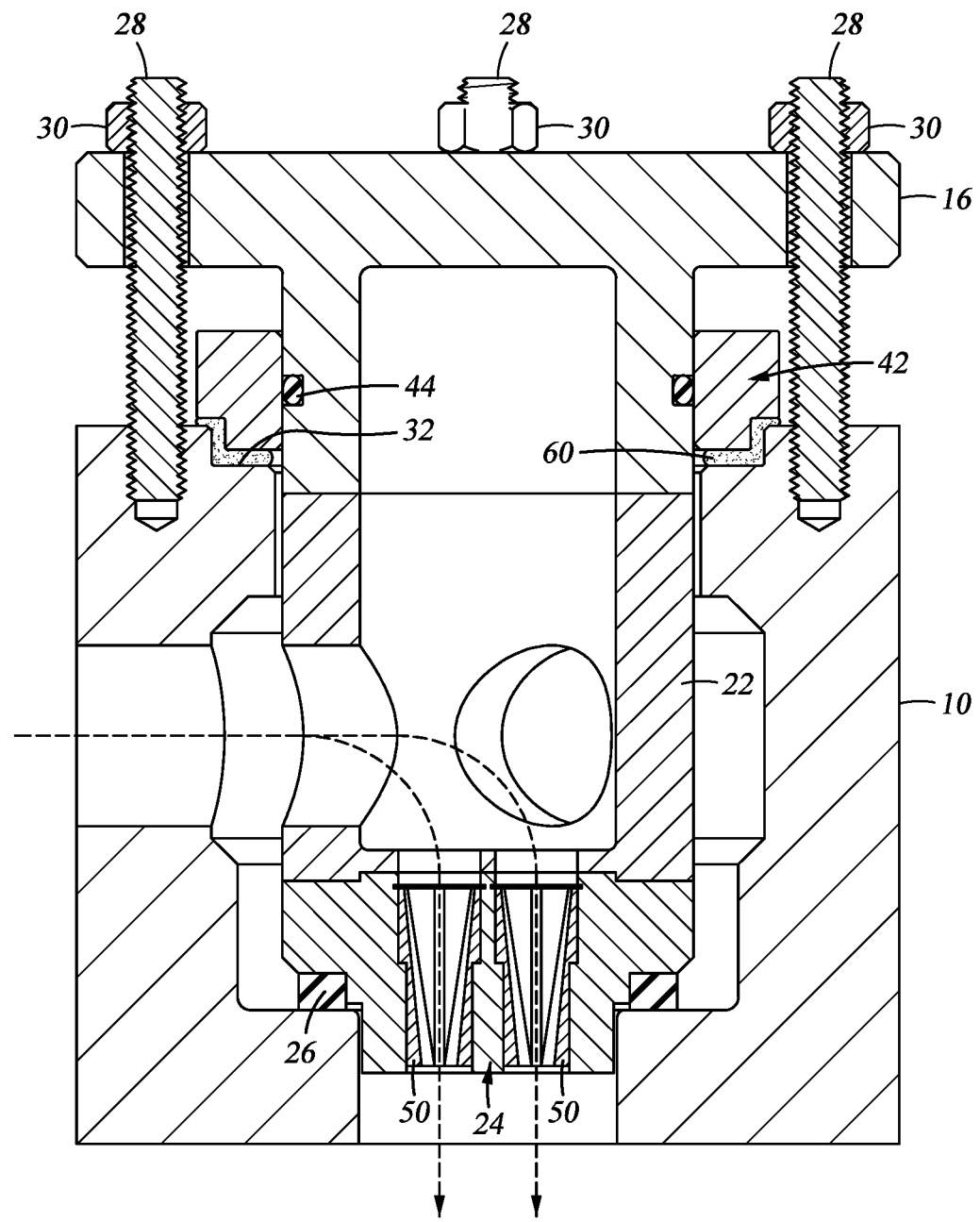
FIG. 6 is a sectional view of an alternative system for retaining a valve assembly in a cavity formed in a cylinder body of a compressor in accordance with this disclosure, wherein a ring is retained using an adhesive.

Referring to FIG. 6, an alternative system for retaining the valve assembly 24 in the cavity formed in the cylinder body 10 of the compressor, is illustrated.

In this embodiment, the ring 42 is fixed to the cylinder body with an adhesive material 60, which implements the ring retainer. A gasket (not shown) may be provided under the ring 42 to act as the seal between the ring 42 and cylinder body 10, or the adhesive material 60 may act as the seal between the ring 42 and cylinder body 10. The adhesive material 60 is typically of a type that can withstand the operating temperature of the compressor cylinder and the environment. The adhesive material 60 may be an epoxy resin, for example.

Figure 7:
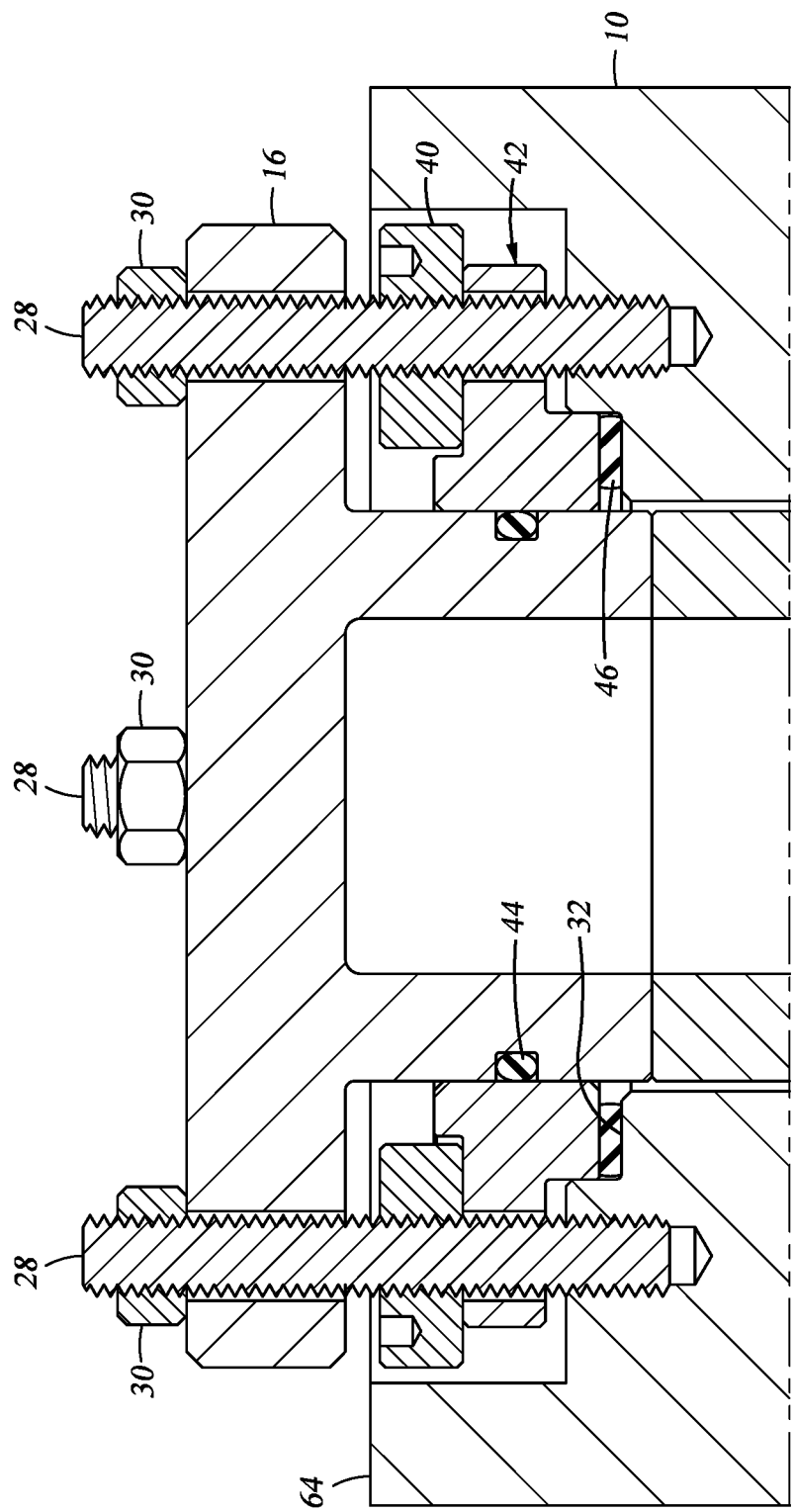
FIG. 7 is a sectional view of a portion of an alternative system for retaining a valve assembly in a cavity formed in a cylinder body of a compressor in accordance with this disclosure, wherein a ring is positioned inside the cavity.

Referring to FIG. 7, a portion of an alternative system for retaining a valve assembly (not shown in FIG. 7) in a cavity formed in a cylinder body 10 of a compressor is illustrated.

In this embodiment, the ring 42 is positioned and held inside the cavity. Thus, the ring 42 and the first seal 46 are recessed below an outer surface 64 of the cylinder body 10. Nevertheless, the ring 42 still has a through-hole positioned adjacent to the cavity formed in the cylinder body 10 of the compressor.

Figure 8:
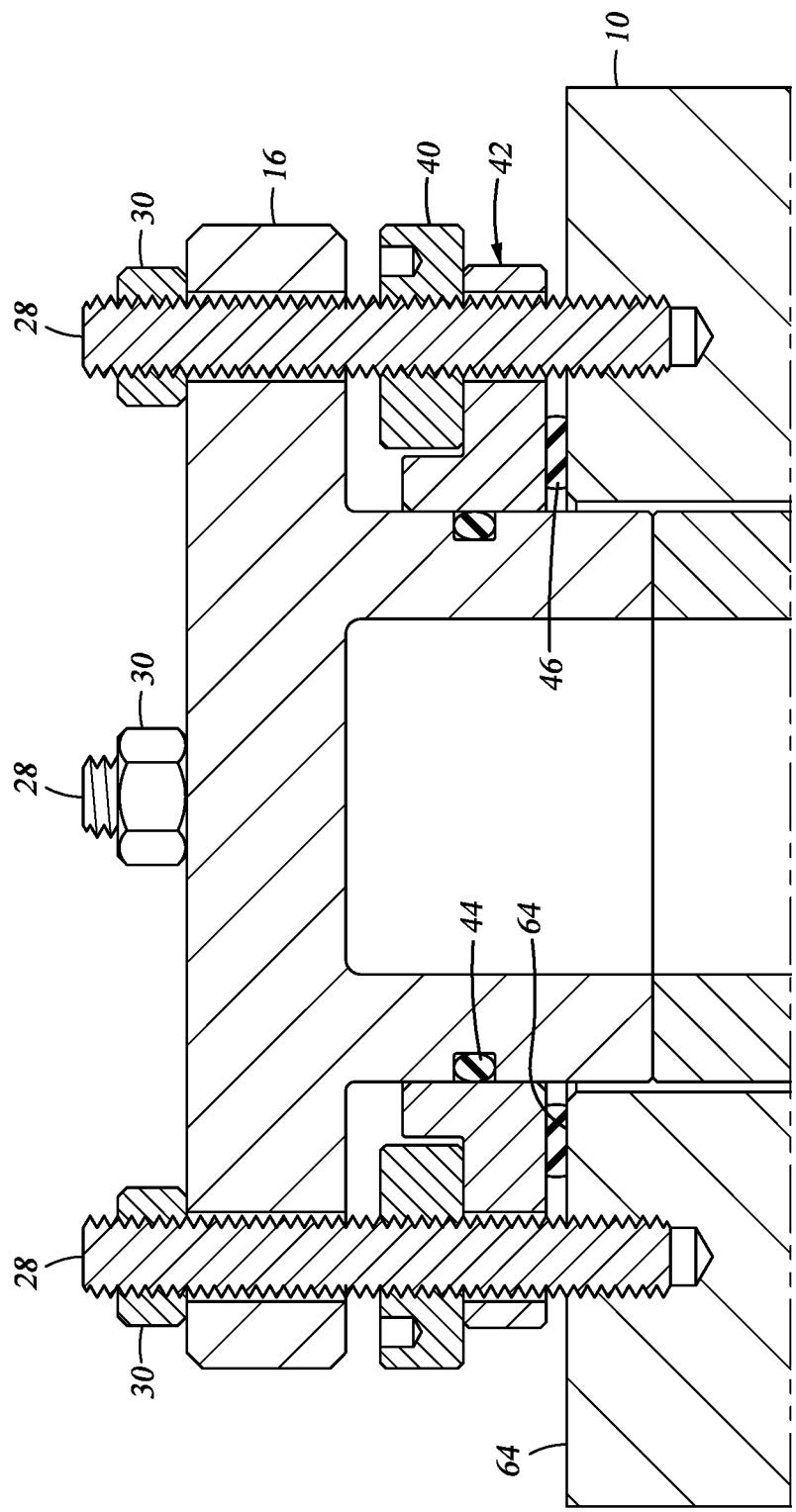
FIG. 8 is a sectional view of a portion of an alternative system for retaining a valve assembly in a cavity formed in a cylinder body of a compressor in accordance with this disclosure, wherein a ring is positioned above the cavity.

Referring to FIG. 8, a portion of another alternative system for retaining a valve assembly (not shown in FIG. 8) in a cavity formed in a cylinder body 10 of a compressor is illustrated.

In this embodiment, the ring 42 is positioned and held above the cavity. The first seal 46 is positioned on an outer surface 64 of the cylinder body 10. Thus, the ring 42 and the first seal 46 protrudes from an outer surface 64 of the cylinder body 10. Nevertheless, the ring 42 still has a through-hole positioned adjacent to the cavity formed in the cylinder body 10 of the compressor.

The systems for retaining the valve assembly 24 in the cavity formed in the cylinder body 10 described in FIG. 3, 4, 5, 6, 7, or 8 may be used for converting a jackbolt cage-cover assembly shown in FIG. 1. The systems may alternatively be used for converting another known assembly for retaining the valve assembly 24. First, the jackbolt cage-cover assembly shown in FIG. 1, or the other known assembly for retaining the valve assembly 24, is removed from the cavity formed in the cylinder body 10 of the compressor. With the embodiments described in FIG. 3, 4, or 5, if bolts are originally used to secure the cover 16 to the cylinder body 10, these bolts are replaced with studs, such as the plurality of cover studs 28. A cage 22 sufficiently tall to engage the valve assembly 24 and the cover 16, is provided. The first seal 46 is disposed on the cylinder body 10 of the compressor. The second seal 44 is provided in a groove formed in the cover 16 (or in a groove formed in the ring 42). The ring 42 placed on the cylinder body 10 such that the through-hole of the ring 42 is positioned adjacent to the cavity. The cover 16 is inserted at least partially inside the through-hole of the ring 42. The ring 42 is used to compress the first seal 46. The cover 16 is used to indirectly compress a third seal (e.g., the valve gasket seal 26) disposed between the valve assembly 24 and the cylinder body 10. The compressions of the first seal 46 and the third seal can be independently adjusted because the cover 16 and the ring 42 can slide relative to each other within a range of relative positions. However, the second seal 44 is maintained squeezed. The ring 42 is held in position using the ring retainer. The cover 16 is held using the cover retainer. With the embodiments described in FIG. 3, 4, 6, 7, or 8, the typical process is to hold the ring 42 in place first, then tighten the cover nuts 30. The tightening of the cover nuts 30 causes the first sealing surface 52 to slide relative to the ring 42. With the embodiment described in FIG. 5, the cover nuts 30 are tightened first to push the cage 22 against the valve assembly 24 and compress the valve gasket 26. Then, the plurality of jackbolts 62 in the cover 16 are tightened to push the ring 42 down against the first seal 46 and hold the ring 42 in place. Thus, the cover nuts 30 are not the primary means for holding the ring 42 down or for compressing the first seal 46 between the ring 42 and the cylinder body 10 to prevent gas leakage under the ring 42.

What is claimed is:

1. A system for retaining a valve assembly in a cavity formed in a cylinder body of a compressor, comprising:
   a ring having a through-hole positioned adjacent to the cavity formed in the cylinder body of the compressor;
   a cover sized to be at least partially inserted inside the through-hole of the ring, the cover being further sized such that the cover and the ring can slide relative to each other within a range of relative positions;
   a first seal sized to be positioned between the ring and the cylinder body of the compressor;
   a second seal sized to be positioned between the ring and the cover, the second seal being configured such that the second seal remains squeezed between the ring and the cover when the cover and the ring slide relative to each other within the range of relative positions;
   a ring retainer capable of holding the ring in position;
   a cover retainer secured to the cylinder body of the compressor and capable of holding the cover at least partially inserted in the through-hole of the ring and at an adjustable position relative to the cylinder body of the compressor; and
   a cage configured to allow gas flow therethrough, the cage being located between the valve assembly and the cover, wherein the cover applies a downward force on the cage and the valve assembly to compress a third seal located between the valve assembly and the cylinder body of the compressor.

2. The system of claim 1,
   wherein the ring retainer comprises an adhesive disposed between the ring and the cylinder body, and wherein the ring is fixed to the cylinder body by the adhesive, and
   wherein the cover retainer includes a plurality of studs, each of the plurality of studs being secured in the cylinder body of the compressor, and the cover retainer further includes a plurality of cover nuts, each of the plurality of studs engaging said some of the plurality of studs.

3. The system of claim 2, wherein the first seal and the ring retainer are integrated into the adhesive.

4. The system of claim 1, wherein the ring retainer includes a plurality of ring nuts, each sized to engage one of a plurality of studs, each of the plurality of studs being secured in the cylinder body of the compressor.

5. The system of claim 4, wherein the cover retainer includes at least some of the plurality of studs and a plurality of cover nuts engaging said some of the plurality of studs.

6. The system of claim 1, wherein a compression of the second seal does not change when the cover and the ring slide relative to each other within the range of relative positions.

7. The system of claim 6, wherein the cover includes a groove, wherein the second sealing surface is located inside the groove, and wherein the first sealing surface is located on the through-hole of the ring.

8. The system of claim 1, wherein the ring includes a first sealing surface having a surface-finish roughness suitable for providing a static gas seal against the second seal, wherein the cover includes a second sealing surface having a surface-finish roughness suitable for providing a static gas seal against the second seal, and wherein the second seal is an O-ring.

9. The system of claim 1, wherein the first seal is a gasket seal disposed on a shoulder located in the cavity formed in the cylinder body of the compressor.

10. The system of claim 1,
    wherein the ring includes a flange having a plurality of holes,
    wherein the cylinder body of the compressor includes a corresponding plurality of threaded holes aligned with the plurality of holes,
    wherein the ring retainer includes a plurality of bolts sized to pass through the holes in the flange and engage the threaded holes in the cylinder body of the compressor, and
    wherein the cover retainer includes a plurality of studs, each of the plurality of studs being secured in the cylinder body of the compressor, and the cover retainer further includes a plurality of cover nuts, each of the plurality of studs engaging said some of the plurality of studs.

11. The system of claim 1,
    wherein the cover has a plurality of threaded through-holes intersecting an abutment surface of the ring,
    wherein the ring retainer includes a plurality of jackbolts sized to pass through the threaded through-holes and engage the abutment surface of the ring, and
    wherein the cover retainer includes a plurality of studs, each of the plurality of studs being secured in the cylinder body of the compressor, and the cover retainer further includes a plurality of cover nuts, each of the plurality of studs engaging said some of the plurality of studs.

12. A method for converting a system for retaining a valve assembly of a compressor, comprising:
    removing the system for retaining the valve assembly from a cavity formed in a cylinder body of the compressor;
    providing a first seal on the cylinder body of the compressor;
    positioning a ring having a through-hole against the first seal so that the first seal is located between the ring and the cylinder body of the compressor, and so that the through-hole of the ring is adjacent to the cavity formed in the cylinder body of the compressor, providing a second seal on the ring or a cover, the second seal being an inner or outer diameter seal;
    providing a cage sized to engage the valve assembly and the cover, wherein the cage is configured to allow gas flow therethrough; and
    compressing a third seal disposed between the valve assembly and the cylinder body of the compressor by sliding the cover relative to the cylinder body of the compressor,
    inserting the cover at least partially inside the through-hole of the ring so that the second seal is located between the ring and the cover;
    holding the ring in position using a ring retainer;

sliding the cover and the ring relative to each other within a range of relative positions while maintaining the second seal loaded for adjusting a position of the cover relative to the cylinder body of the compressor; and holding the cover at least partially inserted in the through-hole of the ring at the adjusted position using a cover retainer.

13. The method of claim 12, wherein a compression of the second seal does not change when the cover and the ring slide relative to each other within the range of relative positions.

14. The method of claim 13, wherein the cover includes a groove, wherein the second sealing surface is located inside the groove, and wherein the second sealing surface is located on the through-hole of the ring.

15. The method of claim 12, comprising causing the cover and the ring to slide relative to each other using one or more of the ring retainer or the cover retainer.

16. The method of claim 15, wherein the ring retainer comprises an adhesive disposed between the ring and the cylinder body, and wherein the ring is fixed to the cylinder body by the adhesive.

17. The method of claim 16, wherein the first seal and the ring retainer are integrated into the adhesive.

18. The method of claim 15, wherein the ring retainers includes a plurality of ring nuts, each sized to engage one of a plurality of studs, each of plurality of studs being secured in the cylinder body of the compressor.

19. The method of claim 18, wherein the cover retainer includes at least some of the plurality of studs, and a plurality of cover nuts engaging said some of the plurality of studs.

20. The method of claim 16, wherein the ring includes a flange having a plurality of holes, wherein the cylinder body of the compressor includes a corresponding plurality of threaded holes aligned with the plurality of holes, wherein the ring retainer includes a plurality of bolts sized to pass through the holes in the flange and engage the threaded holes in the cylinder body of the compressor, and wherein the cover retainer includes a plurality of studs, each of the plurality of studs being secured in the cylinder body of the compressor, and the cover retainer further includes a plurality of cover nuts, each of the plurality of studs engaging said some of the plurality of studs.

21. The method of claim 15, wherein the cover has a plurality of threaded through-holes intersecting an abutment surface of the ring, wherein the ring retainer includes a plurality of bolts sized to pass through the threaded through-holes and engage the abutment surface of the ring, and wherein the cover retainer includes a plurality of studs, each of the plurality of studs being secured in the cylinder body of the compressor, and the cover retainer further includes a plurality of cover nuts, each of the plurality of studs engaging said some of the plurality of studs.

22. The method of claim 12, wherein the ring includes a first sealing surface having a surface-finish roughness suitable for providing a static gas seal against the second seal, wherein the cover includes a second sealing surface having a surface-finish roughness suitable for providing a static gas seal against the second seal, and wherein the second seal is an O-ring.

23. The method of claim 12, wherein the first seal is a gasket seal on a shoulder of the cavity formed in the cylinder body of the compressor.

* * * * *